ABSTRACT

United States Patent [19]

Yamamoto et al.

[11] Patent Number: 4,939,528

[45] Date of Patent: Jul. 3, 1990

[54] EQUIPMENT REQUIRING EXTERNAL CARTRIDGE TO BE ASSEMBLED THEREIN

[75] Inventors: Takemi Yamamoto; Masashi Ueda; Kazuo Sangyoji; Morimasa Mano, all of Nagoya; Kazuhiko Matsuda, Konan, all of Japan

[73] Assignee: Brother Kogyo Kabushika Kaisha, Aichi, Japan

[21] Appl. No.: 288,555

[22] Filed: Dec. 22, 1988

[30] Foreign Application Priority Data

Dec. 23, 1987 [JP] Japan ............................ 62-195157[U]

[51] Int. Cl.$^5$ ............................................... G01D 9/00
[52] U.S. Cl. ........................................... 346/17; 358/38
[58] Field of Search .............................. 346/17; 358/38

[56] References Cited

U.S. PATENT DOCUMENTS 4,782,365 11/1988 Taragi .................................... 355/38
4,829,360 5/1989 Yamamoto et al. ................... 355/38

FOREIGN PATENT DOCUMENTS 0013193 2/1981 Japan .
0074181 5/1982 Japan .
0063494 4/1983 Japan .
0093376 5/1984 Japan .

OTHER PUBLICATIONS

J. A. Craft, "Low Cost Cartridge Code Detector", IBM Tech. Discl., vol. 25, No. 4, 1982.

Primary Examiner—George H. Miller, Jr.
Assistant Examiner—Huan Tran
Attorney, Agent, or Firm—Oliff & Berridge

[57] ABSTRACT

An equipment which requires an external unit to be assembled therein for starting inherent operation. The equipment includes a detection means for detecting an identification mark such as a trade mark affixed to the external unit. The equipment is only operable upon detection of a proper identification mark. The equipment may be a printer and an image recording apparatus such as a copying machine, and the external unit may be an image recording medium cassette such as an ink ribbon cassette and a rolled photosensitive sheet cartridge.

8 Claims, 3 Drawing Sheets

EQUIPMENT REQUIRING EXTERNAL CARTRIDGE TO BE ASSEMBLED THEREIN

BACKGROUND OF THE INVENTION

The present invention relates to an equipment or apparatus which is operable when assembling therein an external unit such as a cartridge and a cassette.

One typical example of an external unit is a cassette or a cartridge which is assemblable into an image recording medium. Such cartridge may be an ink ribbon cassette or a process cartridge for use in a typewriter and a printer, a toner cartridge, and a rolled image recording medium for use in an image recording apparatus or a copying machine.

Referring to the rolled image recording medium, it may be a photosensitive pressure sensitive image recording medium when a transfer type image recording medium is used for forming a latent image on the medium. Alternatively, the image recording medium may be a self-contained type image recording medium on which a visible image is finally provided thereon. These images are only obtainable when the sheet cartridge is assembled into an image recording apparatus or a copying machine and is used in cooperation with ambient mechanical and optical components.

The self-contained type image recording medium is disclosed in U.S. Pat. No. 4,440,846 in which an encapsulated chromogenic material or dye precursor and a developer material are co-deposited on one surface of a single substrate as one layer or as two contiguous layers. Further, the transfer type image recording medium is disclosed in U.S. Pat. No. 4,399,209 wherein the developer material is coated on a separate substrate as a separate developer or copy sheet. More specifically, in the transfer type recording medium, it includes a first image recording medium and a second image recording recording medium. The first medium comprises a photosensitive pressure sensitive recording medium provided with microcapsules encapsulating therein a first material (chromogenic material) having first and second phases dependent on light exposure. The second image recording medium comprises a developer medium provided with a second material (developer material) which provides an output visible image upon reaction with the first material.

As is well known, the printer cannot perform its printing operation unless the external unit such as the ink ribbon cassette is assembled in the printer. Similarly, the image recording apparatus or copying machine cannot perform its image recording operation unless the sheet cartridge is assembled in the apparatus.

Generally, the above-described image recording mediums may provide variations in characteristics such as photosensitivity and pressure sensitivity due to difference in production methods dependent on each manufacturer. Therefore, when operating the image recording apparatus, an operator should select optimum sheet cartridge best-available for the apparatus, which optimum sheet cartridge may be produced by the manufacturer who also makes the image recording apparatus, or the cartridge may be supplied under assurance or warranty by the manufacturer. The same is true with respect to other types of equipment which require exchangeable cartridge or cassette.

However, according to a conventional equipment, if an improper cartridge such as an imitation or counterfeit having degraded characteristics is inadvertently assembled into the equipment, the apparatus may be operated to provide a low quality output, such as low quality visible image. As a result, good will of the manufacture may decline. Alternatively, if an improper cartridge is used, the apparatus may become inoperable.

SUMMARY OF THE INVENTION

It is therefore, an object of the present invention to overcome the above-described drawbacks and deficiencies, and to provide an improved equipment which receives therein an external unit such as a cartridge and a cassette.

Another object of the invention is to provide a combination of an equipment and an external unit, which combination allows operation of the equipment only when the proper unit is installed thereinto. The equipment may be a printer, an image recording apparatus and a copying machine, and the external unit may be an image recording medium cassette or cartridge such as ink ribbon cassette and a rolled photosensitive pressure sensitive sheet cartridge.

To attain these and other objects, according to the present invention, there is provided an equipment which is first operable upon installation of an external unit thereinto, the external unit being provided with a predetermined identification mark indicative of a first information, the equipment comprising; a detection means provided at a position in confrontation with the identification mark upon assembly of the external unit for detecting the identification mark; and, means for starting operation of the equipment when the predetermined identification mark is detected by the detection means, the starting means being operably connected to the detection means.

With the structure, only when the detection means detects the predetermined identification mark, the equipment becomes operable state. As a result, improper operation or break-down of the equipment due to employment of an erroneous external unit can be obviated.

DETAILED DESCRIPTION OF THE INVENTION

A first embodiment according to this invention will be described with reference to FIGS. 1 thru 3. The embodiment concerns an image recording apparatus which employs the above-described transfer-type image recording medium capable of color copying as disclosed in U.S. Pat. No. 4,399,209.

Figure 1:
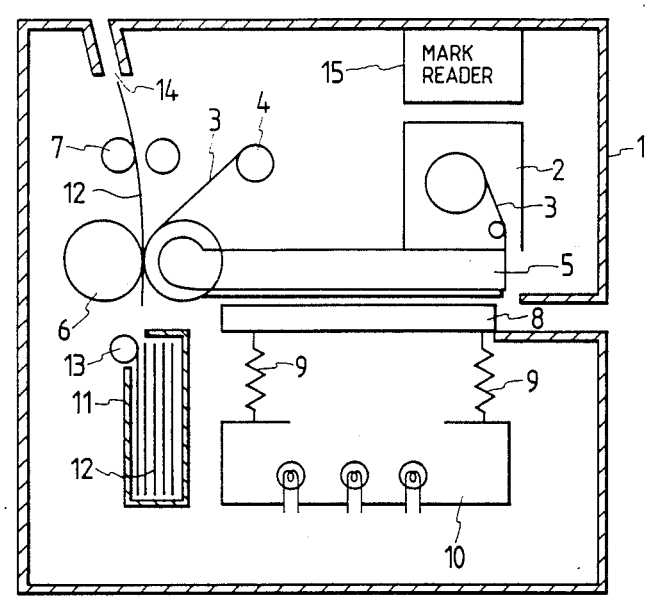
FIG. 1 is a schematic illustration showing an image recording apparatus and a sheet roll cartridge assembled therein.

As shown in FIG. 1, an image recording apparatus has a main frame 1 in which a light source 10 is disposed at a lower portion. The light source 10 includes a plurality of lamps. Above the light source 10, an original support mechanism 8 is positioned so as to support an original (not shown). The mechanism 8 is slidably disposed within the apparatus, so that the original assembled within the mechanism 8 at outside of the apparatus is inserted thereinto. The original has light transmissive characteristics. Above the mechanism 8, an exposure stand 5 is disposed. Further, coil springs 9 are connected between the light source 10 and the original support mechanism 8 so as to closely interpose an image recording medium 3 between the mechanism 8 and the stand 5.

At one side of the exposure stand 5 (left side in FIG. 1), an image fixing unit is provided. The image fixing unit includes a pressure fixing roller 6 and a thermal fixing roller 7 positioned downstream of the roller 6. Further, a developer sheet discharge port 14 is provided at a position above the thermal fixing roller 7 for taking out a developer sheet 12 which carries final visible image.

At another side (right side in FIG. 1) of the exposure stand 5 and above the stand 5, a sheet roll cartridge 2 is disposable. The sheet roll cartridge 2 is detachably provided with respect to the apparatus and stores therein the image recording medium 3, i.e., a photosensitive pressure sensitive image recording sheet. Further, a takeup roller 4 is also disposed above the exposure stand 5 so as to wind light-exposed photosensitive sheet 3 thereover. The sheet 3 pulled out of the cartridge 2 is adapted to pass along a lower surface of the exposure stand 5 and the pressure fixing roller 6, and is then taken-up by the take up roller 4.

Figure 2:
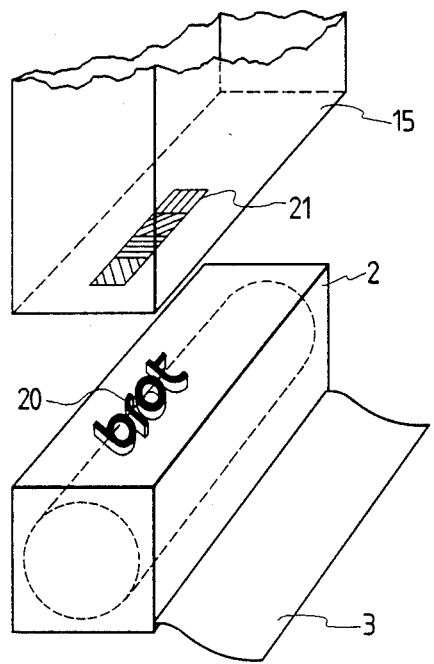
FIG. 2 is a segmental perspective view showing the sheet roll cartrige and a sheet roll receiving portion of the image recording apparatus according to a first embodiment of the present invention.

As shown in FIG. 2, the sheet roll cartridge 2 has its upper surface provided with an identification mark 20 such as a logo. The logo mark 20 identifies a first information such as a trade mark and a trade name which identifies its manufacturer or the origin of the sheet 3. The logo mark 20 protrudes to allow the apparatus to enable its operation upon detection of the mark. Further, protrusion amount or depth of the logo mark 20 is indicative of a second type of information, such as the characteristics of the photosensitive sheet 3, for example, its photosensitivity. Therefore, the protrusion amount functions to give additional information for further determination of the operation of the apparatus.

Turning back to FIG. 1, a developer sheet cassette 11 is positioned below the fixing unit. In the cassette 11, the developer sheets 12 are accommodated. Further, a feed roller 13 is rotatably provided so as to supply the developer sheet 12. Each one of the developer sheet 12 is adapted to be fed toward an inlet portion of the fixing unit where the developer sheet 12 is superposed with the light exposed photosensitive sheet 3 for pressure developing and fixing an image at the developer sheet 12 which image corresponds to a latent image on the photosensitive sheet 3.

As shown in FIG. 1, an identification mark reader or detector 15 such as a logo reader is disposed at a position above the sheet roll cartridge 2 for reading the logo mark 20 provided at the sheet roll cartridge 2. The mark reader 15 is provided with a recessed pattern engageable with the protruding pattern of the logo 20. If the improper logo is provided to the sheet roll cartridge 2, or no logo is provided thereto, the recessed pattern prevents the cartridge from being assembled into the apparatus. Furthermore, at recessed portions of the recessed pattern, information reading elements 21 are provided so as to measure the amount of protrusion amount of the logo 20.

Figure 3:
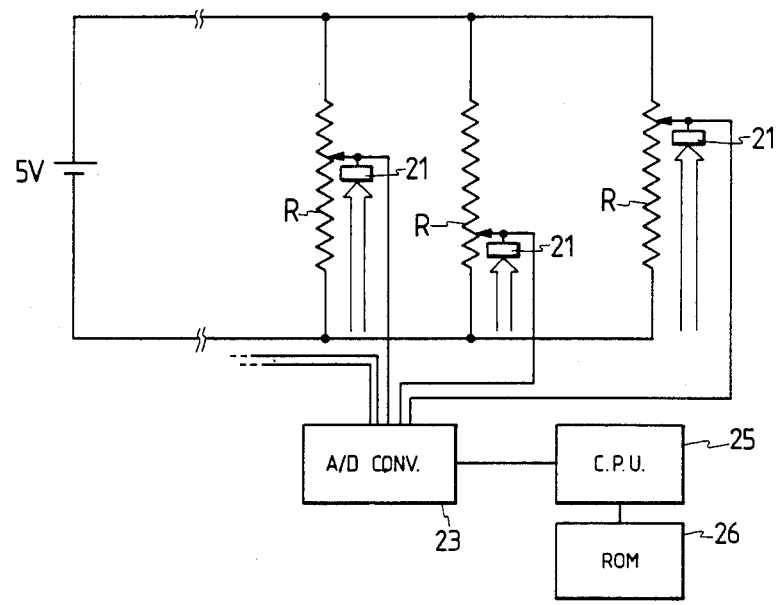
FIG. 3 is a circuit diagram functioning as a logo reader which logo is provided at the sheet roll cartridge according to the first embodiment of this invention.

The information reading elements 21 are movable in the vertical direction in response to the protrusion amount of the logo 20 as best shown in FIG. 3. More specifically, each of the information reading elements 21 is connected to each wiper contact of resistors R. Each wiper contact slidably moves along the associated resistor in accordance with the protrusion amount of the logo mark 20 when the latter engages the recessed portion of mark reader 15, to thus define a voltage developed across the wiper contact one end terminal of the resistor R. The voltage developed thereacross applied to the input of an analog-to-digital (A/D) converter 23.

The A/D converter 23 scans its inputs and sequentially converts the voltage signals to digital signals. The latter signals are sequentially supplied to a CPU 25. A first supplied digital signal corresponds, for example, to the leftmost character "b" on the cartridge 2 and the protrusion amount of character "b" represents the type of the cartridge 2. In response to the first digital signal, the CPU 25 reads data out of a predetermined storage location of a memory 26 and checks whether or not the first digital signal is equal to the data read out of the memory 26. If the decison made by the CPU 25 results in "YES", the CPU 25 issues an enabling signal to the equipment to place it in operable condition. On the other hand, if the first digital signal does not agree with the data stored in advance in the memory, the CPU 25 issues a disabling signal and the equipment remains in inoperable condition.

After inssuance of the enabling signal, the CPU 25 is further supplied with a second digital signal which corresponds, for example, to the second character "r" and represents information relating to the photosensitive sheet 3, e.g. exposure characteristic. Specifically, in response to the second digital signal, the CPU 25 determines an optimum amount of light exposure based upon the data stored in the memory 26 and supplies an instruction to the light source 10 so that the latter carries out light exposure under the optimum condition. In a similar fashion, in response to the digital signals supplied to the CPU 25, the latter determines other conditions regarding the photosensitive sheet 3, such as pressure applied to the superposed sheets by the roller 6, and the temperature of the thermal fixing roller 7. Thus, the logo reader also functions as an additional information reader, and accordingly, the equipment is simplified as has low production costs.

The operation mode in accordance with the first embodiment will next be described.

The light transmissive original (not shown) is first fixed at the original support mechanism 8 and the mechanism 8 is inserted into the apparatus. When the logo mark 20 is engaged with the recessed pattern of the detector 15, the proper installation of the cartridge 3 into the apparatus is assured. Then, the identification mark detector 15 detects the protrusion amount of the logo 20, so that the CPU 25 provides an optimum exposure condition in response to the protrusion amount, since the amount is indicative of the photosensitivity of the photosensitive sheet 3.

After the original support mechanism 8 is sufficiently brought into intimate contact with the photosensitive sheet 3 by the biasing force of the coil springs 9 so that the the sheet 3 is brought into intimate contact with the exposure stand 5, the light source 10 is lighted for starting exposure operation. As a result, a latent image corresponding to the original is formed on the photosensitive sheet 3. After exposure, the take-up roller 4 is driven to move the sheet 3 toward the fixing unit. Simultaneously, the feed roller 13 is driven to deliver the developer sheet 12 from the cassette 11. The developer sheet 12 and the photosensitive sheet 3 are superposed with each other at the inlet portion of the fixing unit, and these are subjected to pressure development and image fixing. That is, light exposed microcapsules on the photosensitive sheet 3 is not ruptured, whereas the nonexposed microcapsules are ruptured, so that chromogenic material flows out of the microcapsules and is reacted with the developer material, to thereby provide a visible image on the developer sheet 12. Thereafter, these sheets 3 and 12 are separated from each other, and the photosensitive sheet 3 is wound over the take up roller 4, whereas the developer sheet 12 is directed toward the discharge port 14 through the thermal fixing roller 7 for obtaining sufficient output color tone. In the above-described embodiment, the transfer-type image recording medium comprising the photosensitive sheet 3 and the developer sheet 12 is used. However, other types of recording media can also be used with modification to the fixing unit yet maintaining the exposure system and structure around the sheet roll cartridge 2.

Further, in the above-described embodiment, the light exposure is carried out while maintaining stationary the photosensitive sheet 3 and the light source 10 at the exposure zone so that a two dimensional area exposure is performed. However, movable line-exposure may also be used within the spirit of this invention. In the above-described embodiment, information as to the photosensitivity of the medium can be contained in the amount of projection degree of the logo mark 20. However, other ways of carring such information are also available. For example, various spectroscopic characteristic at a position corresponding to the logo mark are provided, and a photosensor is used to detect the spectroscopic characteristic at that portion so as to finally detect the photosensitivity of the photosensitive sheet 3. For example the identification mark 20 can have a different the optical reflection characteristics than the external unit 2. The second information, regarding the characteristics of the medium within the external unit is indicated by the amount of difference in optical reflection characteristics between the external unit and the identification mark.

Figure 4:
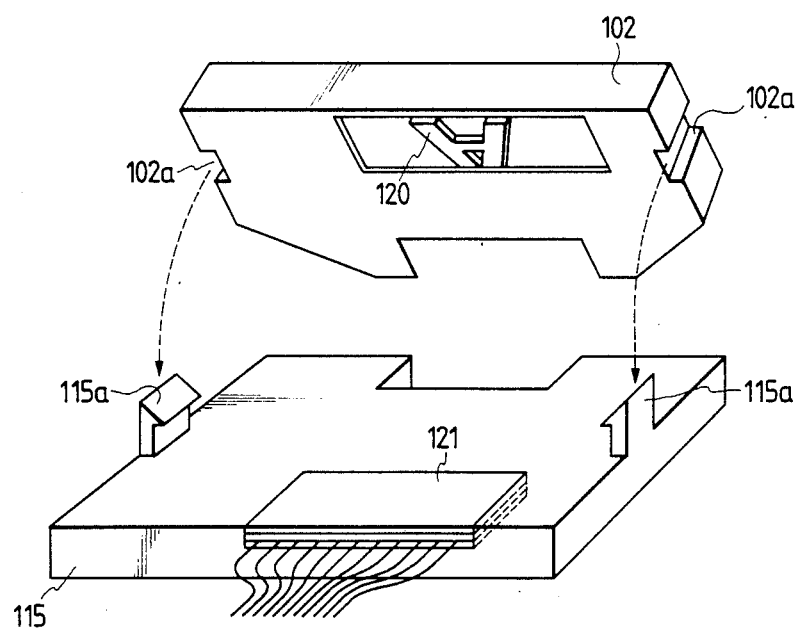
FIG. 4 is a perspective view showing a cartridge and a detecting portion of an equipment according to a second embodiment of this invention.

A second embodiment according to this invention will next be described with reference to FIGS. 4 thru 9. In the second embodiment, the equipment may be a printer and the external unit may be an ink ribbon cassette. As shown in FIG. 4, the ink ribbon cassette 102 has one surface provided with an identification mark 120. For example identification mark 120 protrudes in the form of a logo. Further, notches 102a are formed at side faces of the ink ribbon cassette 102. On the other hand, the printer has a cassette receiving portion 115 provided with a pair of upstanding pawls 115a. The pawls 115 are snap fitted with the notches 102a to secure the cassette 120 to the printer. The cassette receiving portion 115 is also provided with a detecting portion 121 at a position corresponding to the identification mark 120 for detecting the same mark. The mark 120 abuts the detecting portion 121 upon assembly, and the detecting portion 121 undergoes pressure deformation by the identification mark 120.

Figure 5:
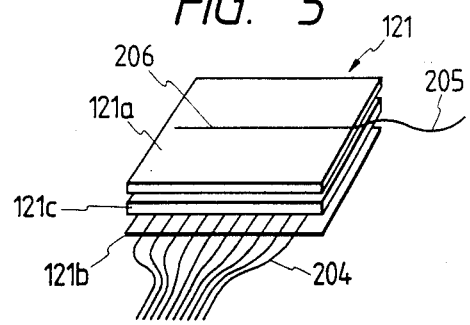
FIG. 5 is a fragmental perspective view showing the detecting portion according to the second embodiment of this invention.
Figure 6:
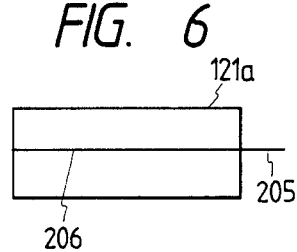
FIG. 6 is a top view showing an upper sheet in the detecting portion according to the second embodiment of this invention.
Figure 7:
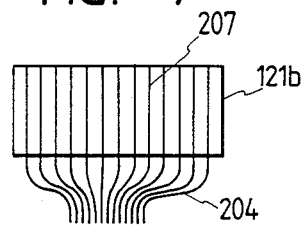
FIG. 7 is a top view showing a lower sheet in the detecting portion according to the second embodiment of this invention.

A structure of the detecting portion 121 is shown in FIGS. 5 thru 7. The detecting portion 121 has a three ply structure and includes an upper print circuit sheet 121a, a lower print circuit sheet 121b and an intermediate pressure sensitive electrically conductive sheet 121c interposed between the upper and lower sheets 121a and 121b. As shown in FIG. 6, in the upper sheet 121a, a single first line 206 extends in a first direction. The single line 206 is printed by, for example, etching, and an external connection line 205 is connected to the line 206. On the other hand, as shown in FIG. 7, the lower sheet 121b is printed with a plurality of second lines 207 each extending in a second direction directed perpendicular to the first direction. Each of the second lines 207 is connected to each of external connecting lines 204. When pressure is applied upon assembly of the external unit 102 to an intersecting point defined between the upper single first line 206 and one of the lower second lines 207, the upper and lower lines are electrically connected to each other at that intersecting point through the intermediate pressure sensitive electrically conductive sheet 121c.

More specifically, when the external unit 102 is assembled to the printer, the identification mark 120 given by the logo is brought into pressure contact with the upper sheet 121a of the detecting portion 121 of the printer. Accordingly, the protruding section of the mark 120 is in conformance with the intersecting points given by the upper and lower lines 106 and 207, to thereby provide electrical connection between the upper and lower sheets at these intersecting points.

Figure 9:
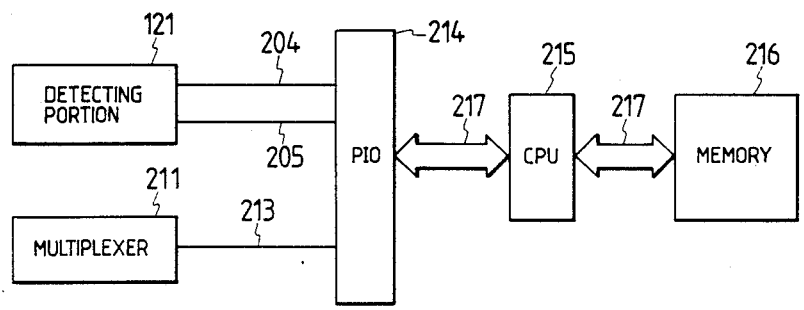

FIG. 9 shows an arrangement for detecting the identification mark 120. This arrangement includes a central processing circuit (CPU) 215 provided at a main body of the printer. The CPU 215 is connected through a bus 217 to a programmable input output port (PIO) 214 which controls input/output signals relative to the detecting portion 121. The lines 205 and 204 are provided between the detecting portion 121 and the PIO 214. The CPU 215 is also connected through a bus 217 to a memory 216 in which mark identification codes are stored. A multiplexer 211 is connected to the PIO 214 through a signal line 213.

Figure 8A:
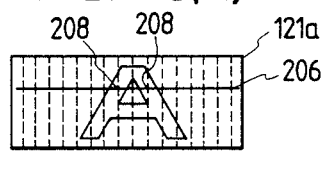
FIGS. 8(a) and 8(b) show top views showing variation in detection dependent on position of an electrically conductive line at the upper sheet accoding to the second embodiment of this invention; and, FIG. 9 is a block circuit diagram showing a control unit incorporated in the second embodiment of this invention.
Figure 8B:
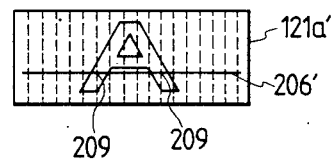

As is apparent from FIGS. 8(a) and 8(b), electrically conductive points are changeable dependent on the position of the single first line 206 provided at the upper sheet 121a. In an example shown in FIG. 8(a), electrical conduction occurs at intersecting points 208 and 208, whereas according to an example shown in FIG. 8(b) such conduction occurs at intersecting points 209 and 209. During production of the equipment, such as printers, the position of the first line 206 relative to the upper sheet 121a is intentionally change after, a predetermined amount of equipment is produced and the mark identification codes to be stored in the memory 216 are also changed in accordance with the change of the position of the line 206. With such modification during production of the equipment, only a specific external unit having the specific identification mark 120 is usable with respect to the equipment. For example, if an imitation external unit is on the market and the user erroneously installs the imitation unit into the equipment, only a limited number of equipment may be operated because of the accidental detection of the mark. However, great numbers of equipment may not be operated since the equipment do not detect the mark.

Operation mode according to the second embodiment will be described.

When the external unit (ink ribbon cassette) 102 is assembled to the receiving portion 115 of the equipment (printer), the detecting portion 121 is subjected to pressure by the protruding mark 120, and the CPU 215 addresses a predetermined mark identification code stored in the memory 216. Then, electrical current is supplied to the first line 206 on the upper sheet 121a of the detecting portion 121 through the PIO 214 and the signal line 205, so that a signal indicative of the intersecting point between the first and second lines 206 and 207 is inputted to the multiplexer 211. This intersecting point signal is indicative of the identification mark provided to the external unit. The thus detected signal is compared with the mark identifcation code read out from the memory 216 so that the correctness of the inserted cassette is determined. Only when the cassette is judged as a proper cassette, CPU will 215 start control to the equipment for performing its inherent printing operation.

In view of the foregoing, according to the present invention, the equipment only becomes operable when the sheet roll cartridge 2 or the ink ribbon cassette 102 is assembled into the equipment and a proper predetermined identification mark provided at the cartridge 2 or the cassette 102 is detected by the detector 15 or 121. Therefore, improper operation or erroneous operation using improper image recording media can be obviated.

While the invention has been described in detail and with reference to specific embodiment thereof, it would be apparent for those skilled in the art that various changes and modifications can be made therein without departing from the spirit and scope of the invention.

What is claimed is:

1. Equipment first operable upon installation of an external unit thereinto, the external unit being provided with a predetermined identification mark indicative of a first information, the identification mark comprising a protruding pattern, the equipment comprising:
   a detection means provided at a position in confrontation with said identification mark upon assembly of said external unit for detecting said identification mark;
   means for starting operation of said equipment when said predetermined identification mark is detected by said detection means, said starting means being connected to said detection means;
   said identification mark further containing second information represented by the amount of protrusion of said identification mark; and
   said detection means further comprising means for reading out said second information.

2. The equipment as defined in claim 1, wherein said equipment comprises an image recording apparatus, and wherein said external unit comprises a rolled photosensitive pressure sensitive image recording medium cartridge.

3. The equipment as defined in claim 1, wherein said equipment comprises a printer, and wherein said external unit comprises an ink ribbon cassette.

4. The equipment as defined in claim 1, wherein said detecting means comprises a recessed pattern member engageable with said protruding pattern.

5. The equipment as defined in claim 1, wherein said means for starting operation comprises a central processing unit.

6. The equipment as defined in claim 4, wherein said means for reading out said second information comprises; at least one movable element movable in response to said protrusion amount of said identification mark; and at least one varaible resistor whose resistance is changeable by the movement of said movable element.

7. Equipment first operable upon installation of an external unit thereinto, the external unit being provided with a predetermined identification mark indicative of a first information, the equipment comprising:
   a detection means provided at a position in confrontation with said identification mark upon assembly of said external unit for detecting said identification mark;
   means for starting operation of said equipment when said predetermined identification mark is detected by said detection means, said starting means being connected to said detection means;
   said identification mark further containing second information, said detection means further comprises means for reading out said second information; and
   wherein said identification mark is represented by a difference in optical reflection characteristics from said external unit, and wherein said second information is indicated by said difference.

8. Equipment first operable upon installation of an external unit thereinto, the external unit being provided with a predetermined identification mark indicative of a first information, the identification mark comprising a protruding pattern, the equipment comprising:
   a detection means provided at a position in confrontation with said identification mark upon assembly of said external unit for detecting said identification mark;
   means for starting operation of said equipment when said predetermined identification mark is detected by said detection means, said starting means being connected to said detection means;
   said identification mark further containing second information, and wherein said detection means further comprises means for reading out said second information;
   said detection means comprising;
   an upper print circuit sheet provided with a single first line extending in a first direction;
   a lower print circuit sheet provided with a plurality of second lines extending in a second direction perpendicular to said first direction; and,
   a pressure sensitive electrically conductive sheet positioned between said upper and lower sheets, said first and second lines being electrically connected together at a predetermined intersecting point therebetween which intersecting point is coincident with said protruding pattern of said identification mark.

* * * * *